(12) United States Patent
Abbott et al.

(10) Patent No.: US 7,314,891 B2
(45) Date of Patent: Jan. 1, 2008

(54) PRODUCTION OF HYDROCARBONS

(75) Inventors: Peter Edward James Abbott, Cleveland (GB); Martin Fowles, North Yorkshire (GB)

(73) Assignee: Johnson Matthey PLC, London (GB)

( * ) Notice: Subject to any disclaimer, the term of this patent is extended or adjusted under 35 U.S.C. 154(b) by 0 days.

(21) Appl. No.: 10/534,239

(22) PCT Filed: Oct. 23, 2003

(86) PCT No.: PCT/GB03/04622

§ 371 (c)(1),
(2), (4) Date: Nov. 8, 2005

(87) PCT Pub. No.: WO2004/041716

PCT Pub. Date: May 21, 2004

(65) Prior Publication Data

US 2006/0135629 A1 Jun. 22, 2006

(30) Foreign Application Priority Data

Nov. 7, 2002 (GB) .................................. 0225961.2

(51) Int. Cl.
*C07C 27/00* (2006.01)
(52) U.S. Cl. ...................... 518/705; 518/700; 518/702; 518/703; 518/704
(58) Field of Classification Search ......... 518/700–705
See application file for complete search history.

(56) References Cited

U.S. PATENT DOCUMENTS 4,690,690 A 9/1987 Andrew et al.
4,695,442 A 9/1987 Pinto et al.
4,888,130 A 12/1989 Banquy
4,910,228 A 3/1990 Lywood
4,999,133 A * 3/1991 Banquy ...................... 252/373

FOREIGN PATENT DOCUMENTS

| EP | 0 233 076 A2 | 8/1987 |
| EP | 0 516 441 A1 | 12/1992 |
| GB | 1 578 270 | 11/1980 |
| WO | WO-97/05947 | 2/1997 |
| WO | WO-00/09441 | 2/2000 |
| WO | WO-03/016250 A1 | 2/2003 |
| WO | WO-03/062142 A1 | 7/2003 |

* cited by examiner

*Primary Examiner*—J. Parsa
(74) *Attorney, Agent, or Firm*—RatnerPrestia

(57) ABSTRACT

A process for production of hydrocarbons including a) reforming a divided hydrocarbon feedstock stream, mixing the first stream with steam, passing the mixture over a catalyst disposed in heated heat exchange reformer tubes to form a primary reformed gas, forming a secondary reformer feed stream including the primary reformed gas and the second hydrocarbon stream, partially combusting the secondary reformer feed stream and bringing the partially combusted gas towards equilibrium over a secondary catalyst, and producing a partially cooled reformed gas, b) further cooling the partially cooled reformed gas below the dew point of steam therein to condense water and separating condensed water to give a de-watered synthesis gas, c) synthesising hydrocarbons from the de-watered synthesis gas by the Fischer-Tropsch reaction and separating some of the synthesised hydrocarbons into a tail gas, and d) incorporating part of the tail gas into the secondary reformer feed stream before partial combustion thereof.

6 Claims, 5 Drawing Sheets

| Stream | P (bara) | T (°C) | Flow rate (kmol/h) | | | | | | |
|---|---|---|---|---|---|---|---|---|---|
| | | | CH$_4$ | CO | CO$_2$ | H$_2$ | H$_2$O | O$_2$ | N$_2$ |
| 12 | 52 | 20 | 22516[a] | 0 | 522 | 0 | 0 | 0 | 42 |
| 24 | 50 | 450 | 22516[a] | 0 | 522 | 0 | 28146 | 0 | 42 |
| 30 | 46 | 772 | 15627 | 3772 | 3639 | 21583 | 18139 | 0 | 42 |
| 36 | 52 | 20 | 5629 | 0 | 130 | 0 | 0 | 0 | 10 |
| 32 | 40 | 50 | 2309 | 839 | 323 | 333 | 0 | 0 | 477 |
| 90 | 50 | 150 | 0 | 0 | 5809 | 0 | 0 | 0 | 0 |
| 98 | 46 | 691 | 23565 | 4611 | 9901 | 21916 | 18139 | 0 | 529 |
| 44 | 50 | 40 | 0 | 0 | 0 | 0 | 0 | 13569 | 68 |
| 48 | 46 | 545 | 1980 | 27929 | 8169 | 57249 | 25425 | 0 | 597 |
| 86 | 1.5 | 50 | 0 | 0 | 8169 | 0 | 0 | 0 | 0 |
| 62 | 20 | 50 | 0 | 0 | 0 | 1396 | 0 | 0 | 0 |
| 64 | 44 | 50 | 1980 | 27929 | 0 | 55853 | 0 | 0 | 597 |
| 68 | 40 | 50 | 25535[b] | 0 | 0 | 0 | 26072 | 0 | 0 |
| 70 | 40 | 50 | 2884 | 1035 | 403 | 416 | 0 | 0 | 597 |
| 72 | 40 | 50 | 575 | 196 | 80 | 83 | 0 | 0 | 120 |

[a] also contains 3570 kmol/h of higher hydrocarbons expressed as CH$_{2.76}$
[b] also contains 25535 kmol/h of higher hydrocarbons expressed as CH$_{2.15}$

Fig. 4

| Stream | | 10 | 36 | 12 | 24 | 30 | 32 | 102 | 44 | 48 | 56 | 58 | 62 | 64 | 70 | 72 | 68 |
|---|---|---|---|---|---|---|---|---|---|---|---|---|---|---|---|---|---|
| Temp | Deg C | 230 | 230 | 230 | 420 | 773 | 89 | 382 | 30 | 550 | 55 | 55 | 71 | 70 | 5 | 5 | 26 |
| Press | kPa | 3625 | 3625 | 3625 | 3500 | 3150 | 3300 | 3250 | 3500 | 2950 | 2700 | 2700 | 1200 | 2600 | 1730 | 1730 | 100 |
| Flow | kmols/hr | 33253 | 8313 | 24940 | 46591 | 61511 | 14329 | 22608 | 16686 | 138025 | 17769 | 120256 | 2741 | 117515 | 21209 | 6893 | 33559 |
| Methane | | 29240 | 7310 | 21930 | 21930 | 17040 | 1968 | 9276 | 0 | 1673 | 0 | 1673 | 0 | 1673 | 2913 | 947 | 1 |
| Ethane | | 1663 | 416 | 1247 | 1247 | 0 | 74 | 490 | 0 | 0 | 0 | 0 | 0 | 0 | 110 | 36 | 0 |
| Propane | | 33 | 8 | 25 | 25 | 0 | 48 | 57 | 0 | 0 | 0 | 0 | 0 | 0 | 71 | 23 | 1 |
| Butane | | 0 | 0 | 0 | 0 | 0 | 67 | 67 | 0 | 0 | 0 | 0 | 0 | 0 | 99 | 32 | 9 |
| CO | | 0 | 0 | 0 | 1 | 4833 | 2166 | 2167 | 0 | 34734 | 0 | 34734 | 0 | 34734 | 3210 | 1043 | 0 |
| CO$_2$ | | 0 | 0 | 0 | 5 | 2633 | 3756 | 3761 | 0 | 5832 | 5 | 5627 | 56 | 5571 | 5567 | 1809 | 10 |
| H$_2$ | | 653 | 163 | 490 | 490 | 24201 | 2392 | 2519 | 0 | 72082 | 0 | 72082 | 2606 | 69476 | 3524 | 1145 | 0 |
| H$_2$O | | 0 | 0 | 0 | 21845 | 11557 | 9 | 9 | 0 | 18551 | 17763 | 788 | 79 | 709 | 13 | 4 | 32074 |
| O$_2$ | | 0 | 0 | 0 | 0 | 0 | 0 | 0 | 16603 | 0 | 0 | 0 | 0 | 0 | 0 | 0 | 0 |
| N$_2$ | | 1663 | 416 | 1247 | 1248 | 1248 | 3520 | 3933 | 42 | 5225 | 0 | 5225 | 0 | 5225 | 5215 | 1695 | 0 |
| Ar | | 0 | 0 | 0 | 0 | 0 | 86 | 86 | 42 | 127 | 0 | 127 | 0 | 127 | 127 | 41 | 0 |
| Propene | | 0 | 0 | 0 | 0 | 0 | 166 | 167 | 0 | 0 | 0 | 0 | 0 | 0 | 247 | 80 | 4 |
| Pentane | | 0 | 0 | 0 | 0 | 0 | 46 | 46 | 0 | 0 | 0 | 0 | 0 | 0 | 68 | 22 | 26 |
| Hexane | | 0 | 0 | 0 | 0 | 0 | 23 | 23 | 0 | 0 | 0 | 0 | 0 | 0 | 33 | 11 | 51 |
| Heptane | | 0 | 0 | 0 | 0 | 0 | 6 | 6 | 0 | 0 | 0 | 0 | 0 | 0 | 9 | 3 | 64 |
| Octane | | 0 | 0 | 0 | 0 | 0 | 1 | 1 | 0 | 0 | 0 | 0 | 0 | 0 | 2 | 1 | 69 |
| Nonane | | 0 | 0 | 0 | 0 | 0 | 0 | 0 | 0 | 0 | 0 | 0 | 0 | 0 | 0 | 0 | 65 |
| Decane | | 0 | 0 | 0 | 0 | 0 | 0 | 0 | 0 | 0 | 0 | 0 | 0 | 0 | 0 | 0 | 58 |
| C13 | | 0 | 0 | 0 | 0 | 0 | 0 | 0 | 0 | 0 | 0 | 0 | 0 | 0 | 0 | 0 | 155 |
| C15 | | 0 | 0 | 0 | 0 | 0 | 0 | 0 | 0 | 0 | 0 | 0 | 0 | 0 | 0 | 0 | 189 |
| C20 | | 0 | 0 | 0 | 0 | 0 | 0 | 0 | 0 | 0 | 0 | 0 | 0 | 0 | 0 | 0 | 208 |
| C25 | | 0 | 0 | 0 | 0 | 0 | 0 | 0 | 0 | 0 | 0 | 0 | 0 | 0 | 0 | 0 | 182 |
| C30 | | 0 | 0 | 0 | 0 | 0 | 0 | 0 | 0 | 0 | 0 | 0 | 0 | 0 | 0 | 0 | 391 |

Fig. 5

PRODUCTION OF HYDROCARBONS

This application is the U.S. national phase application of PCT International Application No. PCT/GB2003/004622, filed Oct. 23, 2003, and claims priority of British Patent Application No. 0225961.2, filed Nov. 7, 2002.

FIELD OF THE INVENTION

This invention relates to the production of hydrocarbons by the Fischer-Tropsch process and to the production of synthesis gas therefor. The synthesis gas contains hydrogen and carbon oxides and is produced by the catalytic reaction of steam with a hydrocarbon feedstock in a process known as steam reforming.

BACKGROUND OF THE INVENTION

Steam reforming is widely practised and is used to produce hydrogen streams and synthesis gas for a number of processes such as ammonia, methanol as well as the Fischer-Tropsch process. In a steam reforming process, a desulphurised hydrocarbon feedstock, e.g. methane, natural gas or naphtha, is mixed with steam and passed at elevated temperature and pressure over a suitable catalyst, generally a transition metal, especially nickel, on a suitable support. Methane reacts with steam to produce hydrogen and carbon oxides. Any hydrocarbons containing two or more carbon atoms that are present are converted to carbon monoxide and hydrogen, and in addition, the reversible methane/steam reforming and shift reactions occur. The extent to which these reversible reactions proceed depends upon the reaction conditions, e.g. temperature and pressure, the feed composition and the activity of the reforming catalyst. The methane/steam reforming reaction is highly endothermic and so the conversion of methane to carbon oxides is favoured by high temperatures. For this reason, steam reforming is usually effected at outlet temperatures above about 600° C., typically in the range 650° C. to 950° C., by passing the feedstock/steam mixture over a primary steam reforming catalyst disposed in externally heated tubes. The composition of the product gas depends on, inter alia, the proportions of the feedstock components, the pressure and temperature. The product normally contains methane, hydrogen, carbon oxides, steam and any gas, such as nitrogen, that is present in the feed and which is inert under the conditions employed. For applications such as Fischer-Tropsch synthesis, it is desired that the molar ratio of hydrogen to carbon monoxide is about 2 and the amount of carbon dioxide present is small.

In order to obtain a synthesis gas more suited to Fischer-Tropsch synthesis, the primary reformed gas may be subjected to secondary reforming by partially combusting the primary reformed gas using a suitable oxidant, e.g. air or oxygen. This increases the temperature of the reformed gas, which is then passed adiabatically through a bed of a secondary reforming catalyst, again usually nickel on a suitable support, to bring the gas composition towards equilibrium. Secondary reforming serves three purposes: the increased temperature resulting from the partial combustion and subsequent adiabatic reforming results in a greater amount of reforming so that the secondary reformed gas contains a decreased proportion of residual methane. Secondly the increased temperature favours the reverse shift reaction so that the carbon monoxide to carbon dioxide ratio is increased. Thirdly the partial combustion effectively consumes some of the hydrogen present in the reformed gas, thus decreasing the hydrogen to carbon oxides ratio. In combination, these factors render the secondary reformed gas formed from natural gas as a feedstock more suited for use as synthesis gas for applications such as Fischer-Tropsch synthesis than if the secondary reforming step was omitted. Also more high grade heat can be recovered from the secondary reformed gas: in particular, the recovered heat can be used to heat the catalyst-containing tubes of the primary reformer. Thus the primary reforming may be effected in a heat exchange reformer in which the catalyst-containing reformer tubes are heated by the secondary reformed gas. Examples of such reformers and processes utilising the same are disclosed in for example U.S. Pat. No. 4,690,690 and U.S. Pat. No. 4,695,442.

WO 00/09441 describes a process wherein a feedstock/steam mixture is subjected to primary reforming over a catalyst disposed in heated tubes in a heat exchange reformer, the resultant primary reformed gas is subjected to secondary reforming by partially combusting the primary reformed gas with an oxygen-containing gas, the resultant partially combusted gas then being brought towards equilibrium over a secondary reforming catalyst, and the resultant secondary reformed gas used to heat the tubes of the heat exchange reformer. In the process, no hydrocarbon feedstock by-passes the primary reforming stage. Carbon dioxide is separated from the secondary reformed gas before or after its use for the synthesis of carbon containing compounds, and is recycled to the primary reformer feed. In one embodiment described in WO 00/09441, the recycled carbon dioxide is part of the tail gas from a Fischer-Tropsch synthesis process, and is added to the natural gas feedstock prior to desulphurisation of the latter.

Fischer-Tropsch tail gas is liable to contain a significant amount of carbon monoxide. If this is added to the feedstock prior to primary reforming in a heat exchange reformer, the carbon monoxide undergoes the exothermic methanation reaction resulting in a faster increase in temperature of the gas undergoing reforming than if the tail gas had not been added. The temperature difference between the gas undergoing reforming and the heating medium is thus decreased and so more heat transfer area, e.g. more and/or longer heat exchange tubes, is required for a given reforming duty.

In our co-pending application PCT/GB 02/03311 we have demonstrated that this problem may be overcome by addition of the Fischer-Tropsch tail gas to the primary reformed gas before partial combustion thereof, i.e. addition of tail gas to the primary reformed gas between the steps of primary and secondary reforming. Such addition, where carbon dioxide is present in the tail gas or is added from another source, further has the effect of allowing lower steam ratios to be used in the primary reformer. [By the term "steam ratio" we mean the ratio of the number of moles of steam to the number of gram atoms of hydrocarbon carbon in the feed: thus a methane/steam mixture comprising 2 moles of steam per mole of methane has a steam ratio of 2.] This has advantages in respect of providing lower operating costs, for example in steam generation.

Use of lower steam ratios, for example steam ratios below 1.00, can, however, lead to carbon formation on the exposed surfaces of the catalyst. Such carbon formation has the undesirable effect of increasing the pressure drop through the catalyst. It can also result in a loss of catalyst activity. Thus there is a desire to use lower steam ratios than those previously achieved without the risk of increasing carbon deposition.

SUMMARY OF THE INVENTION

We have found that operation at low overall steam ratios with economical reforming of the hydrocarbon feedstock may be achieved by dividing the feedstock into two streams, mixing the first stream with steam and feeding it to the primary reformer and feeding the second stream to the primary reformed gas before secondary reforming along with at least part of the tail gas from the Fischer-Tropsch process. The steam ratio is therefore lower overall but still sufficiently high in the primary reforming step to avoid carbon deposition.

Accordingly the present invention provides a process for the production of hydrocarbons comprising;
a) subjecting a hydrocarbon feedstock to steam reforming by
  i) dividing the feedstock into first and second streams,
  ii) mixing the first stream with steam, passing the mixture of the first stream and steam over a catalyst disposed in heated tubes in a heat exchange reformer to form a primary reformed gas,
  iii) forming a secondary reformer feed stream comprising the primary reformed gas and the second hydrocarbon stream,
  iv) partially combusting the secondary reformer feed stream with an oxygen-containing gas and bringing the resultant partially combusted gas towards equilibrium over a secondary reforming catalyst, and
  v) using the resultant secondary reformed gas to heat the tubes of the heat exchange reformer, thereby producing a partially cooled reformed gas,
b) further cooling the partially cooled reformed gas to below the dew point of the steam therein to condense water and separating condensed water to give a de-watered synthesis gas,
c) synthesising hydrocarbons from said de-watered synthesis gas by the Fischer-Tropsch reaction and separating at least some of the synthesised hydrocarbons, to give a tail gas, and
d) incorporating at least part of said tail gas into the secondary reformer feed stream before the partial combustion of thereof.

BRIEF DESCRIPTION OF THE DRAWINGS

The invention is illustrated by reference to the accompanying drawings in which;

FIG. 4 is a table that contains data calculated for a Fischer-Tropsch process operated in accordance with the schematic depicted in FIG. 2.

FIG. 5 is a table that contains data calculated for a 80,000 barrel-per-day Fischer Tropsch process operated in accordance with the schematic depicted in FIG. 3.

DETAILED DESCRIPTION OF THE INVENTION

Figure 1:
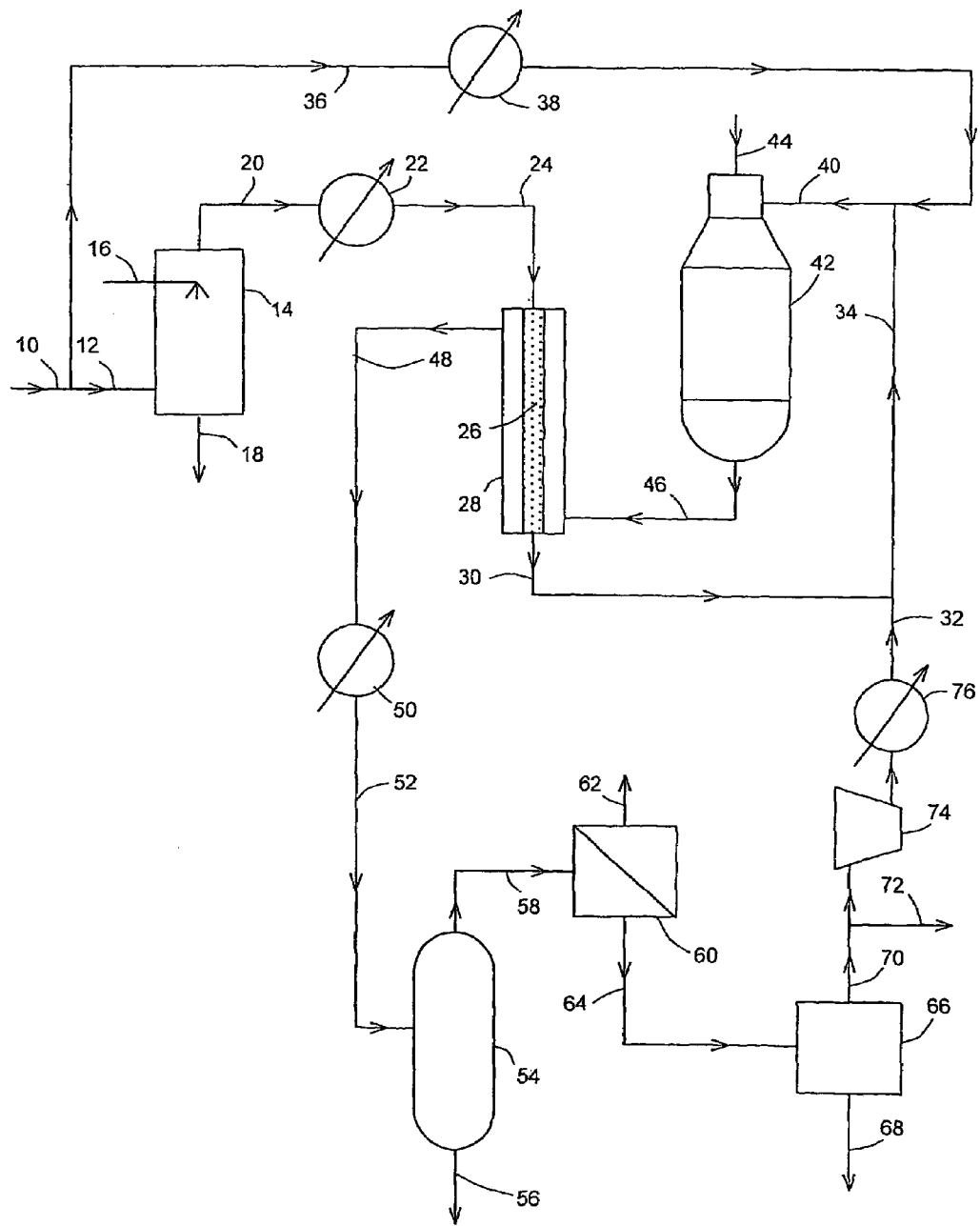
FIG. 1 is a schematic of one embodiment of the invention whereby Fischer-Tropsch tail gas and hydrocarbon feedstock are added separately to the primary reformed gas to form the secondary reformer feed stream.

In the present invention, the primary reforming is effected using a heat exchange reformer. In one type of heat exchange reformer, the catalyst is disposed in tubes extending between a pair of tube sheets through a heat exchange zone. Reactants are fed to a zone above the upper tube sheet and pass through the tubes and into a zone beneath the lower tube sheet. The heating medium is passed through the zone between the two tube sheets. Heat exchange reformers of this type are described in GB 1 578 270 and WO 97/05 947.

Another type of heat exchange reformer that may be used is a double-tube heat exchange reformer as described in U.S. Pat. No. 4,910,228 wherein the reformer tubes each comprise an outer tube having a closed end and an inner tube disposed concentrically within the outer tube and communicating with the annular space between the inner and outer tubes at the closed end of the outer tube with the steam reforming catalyst disposed in said annular space. The external surface of the outer tubes is heated by the secondary reformed gas. The mixture of hydrocarbon feedstock, carbon dioxide and steam is fed to the end of the outer tubes remote from said closed end so that the mixture passes through said annular space and undergoes steam reforming and then passes through the inner tube. As in the double-tube reformer of U.S. Pat. No. 4,910,228, in the present invention preferably insulation is provided on the walls of the inner tube.

In the process of the invention the feedstock may be any gaseous or low boiling hydrocarbon feedstock such as natural gas or naphtha. It is preferably methane or natural gas containing a substantial proportion, e.g. over 90% v/v methane. If the feedstock contains sulphur compounds, before, or preferably after, compression, but before the feedstock is divided, the feedstock is subjected to desulphurisation, e.g. hydrodesulphurisation and absorption of hydrogen sulphide using a suitable absorbent, e.g. a zinc oxide bed. The feedstock is typically compressed to a pressure in the range 10-100 bar abs, particularly 20-60 bar abs.

Before, or preferably after, compression of the feedstock, the feedstock is divided into two streams. The first stream is mixed with steam: this steam introduction may be effected by direct injection of steam and/or by saturation of the feedstock by contact of the latter with a stream of heated water. The amount of steam introduced is such as to give an overall steam ratio of 0.5 to 2, preferably 1 to 2, i.e. 0.5 to 2, preferably 1 to 2 moles of steam per gram atom of hydrocarbon carbon in the feedstock. The steam ratios that may be employed in the process present invention without carbon deposition may be affected by the choice of primary steam reforming catalyst. Typically lower steam ratios may be used when the primary steam reforming catalyst is a precious metal-based catalyst compared to nickel-based catalysts. The amount of steam is preferably minimised as this leads to a lower cost, more efficient process. It is preferred that the steam ratio is below 1.5, more preferably below 1.0. When a steam ratio below 1.0 is used it is preferable that at least a portion of the primary steam reforming catalyst is a precious metal catalyst.

The resultant feedstock/steam mixture is then subjected to reforming. Before it is fed to the heat exchange reformer, the feedstock/steam mixture may be subjected to a step of adiabatic low temperature reforming. In such a process, the hydrocarbon/steam mixture is heated, typically to a temperature in the range 400-650° C., and then passed adiabatically through a bed of a suitable catalyst, usually a catalyst having a high nickel content, for example above 40% by weight. During such an adiabatic low temperature reforming step any hydrocarbons higher than methane react with steam to give a mixture of methane, carbon oxides and hydrogen. The use of such an adiabatic reforming step, commonly termed pre-reforming, is desirable to ensure that the feed to the heat exchange reformer contains no hydrocarbons higher than methane and also contains a significant amount of hydrogen. This is desirable in order to minimise the risk of carbon formation on the catalyst in the heat-exchange reformer.

After any such pre-reforming step, the mixture is further heated, if necessary, to the heat exchange reformer inlet temperature, which is typically in the range 300-500° C. During passage through the reforming catalyst, the endothermic reforming reaction takes place with the heat required for the reaction being supplied from the secondary reformed gas flowing past the exterior surface of the outer tubes. The primary reforming catalyst may be nickel supported on a refractory support such as rings or pellets of calcium aluminate cement, alumina, titania, zirconia and the like. Alternatively, particularly when a steam ratio less than 1.0 is employed, a precious metal catalyst may be used as the primary reforming catalyst. Suitable precious metal catalysts include rhodium, ruthenium and platinum between 0.01 and 2% by weight on a suitable refractory support such as those used for nickel catalysts. Alternatively a combination of a nickel and precious metal catalyst may be used. For example, a portion of the nickel catalyst may be replaced with a precious metal catalyst, such as a ruthenium-based catalyst.

The temperature of the secondary reformed gas is preferably sufficient that the gas undergoing primary reforming leaves the catalyst at a temperature in the range 650-850° C.

In the present invention a proportion of the total hydrocarbon feedstock fed to the process (the second stream) bypasses the primary reforming step and is combined with the primary reformed gas to form a secondary reformer feed stream which is then subjected to partial combustion in a secondary reforming step. The resulting secondary reformed gas is de-watered and used as the synthesis gas for the Fischer-Tropsch synthesis of hydrocarbons. A tail gas from the Fischer-Tropsch synthesis is recycled to the secondary reformer feed stream. In forming the secondary reformer feed stream the Fischer-Tropsch tail gas and second hydrocarbon stream may be added separately in any order to the primary reformed gas or may be pre-mixed if desired before being fed to the primary reformed gas. Pre-mixing the tail gas and second hydrocarbon stream has the advantage that, if necessary, they may be heated together in one rather than two heat exchangers. Howsoever the second hydrocarbon stream and the Fischer-Tropsch tail gas are added it is preferable, to avoid decomposition of the hydrocarbons therein, that they are not heated to temperatures in excess of 420° C. prior to combination with the primary reformed gas.

The secondary reformer feed stream comprising the primary reformed gas/hydrocarbon/tail gas mixture is then subjected to secondary reforming by adding a gas containing free oxygen, effecting partial combustion and passing the partially combusted gas through a secondary reforming catalyst. Whereas some steam may be added to the oxygen containing gas, preferably no steam is added so that the low overall steam ratio for the reforming process is achieved. The secondary reforming catalyst is usually nickel supported on a refractory support such as rings or pellets of calcium aluminate cement, alumina, titania, zirconia and the like. The gas containing free oxygen is preferably substantially pure oxygen, e.g. oxygen containing less than 1% nitrogen. However where the presence of substantial amounts of inerts is permissible, the gas containing free oxygen may be air or enriched air. Where the gas containing free oxygen is substantially pure oxygen, for metallurgical reasons it is preferably fed to the secondary reformer at a temperature below about 250° C.

The amount of oxygen required in the secondary reformer is determined by two main considerations, viz. the desired composition of the product gas, and the heat balance of the heat exchange reformer. In general, increasing the amount of oxygen, thereby increasing the temperature of the reformed gas leaving the secondary reformer, causes the $[H_2]/[CO]$ ratio to decrease and the proportion of carbon dioxide to decrease. Alternatively, if the conditions are arranged such that the temperature is kept constant, increasing the temperature at which the feedstock is fed to the heat exchange reformer decreases the amount of oxygen required (at a constant oxygen feed temperature). Decreasing the required amount of oxygen is advantageous as this means that a smaller, and hence cheaper, air separation plant can be employed to produce the oxygen. The temperature of the feedstock can be increased by any suitable heat source, which may, if necessary, be a fired heater, which of course can use air, rather than oxygen, for the combustion.

The amount of oxygen-containing gas added is preferably such that 40 to 60 moles of oxygen are added per 100 gram atoms of hydrocarbon feedstock fed to the primary and secondary reforming stages. Preferably the amount of oxygen added is such that the secondary reformed gas leaves the secondary reforming catalyst at a temperature in the range 800-1050° C. For a given feedstock/steam mixture, amount and composition of the oxygen-containing gas and reforming pressure, this temperature largely determines the composition of the secondary reformed gas.

The secondary reformed gas is then used to provide the heat required for the primary reforming step by using the secondary reformed gas as the hot gas flowing past the tubes of the heat exchange reformer. During this heat exchange the secondary reformed gas cools by transferring heat to the gas undergoing primary reforming. Preferably the secondary reformed gas cools by several hundred ° C. but of course it will leave the heat exchange reformer at a temperature somewhat above the temperature at which the feedstock/steam/carbon dioxide mixture is fed to the heat exchange reformer. Preferably the secondary reformed gas leaves the heat exchange reformer at a temperature in the range 500-650° C.

After leaving the heat exchange reformer, the secondary reformed gas is then further cooled. Heat recovered during this cooling may be employed for reactants pre-heating and/or for heating water used to provide the steam employed in the primary reforming step. As described hereinafter, the recovered heat may additionally, or alternatively, be used in a carbon dioxide separation step.

The secondary reformed gas is cooled to a temperature below the dew point of the steam in the secondary reformed gas so that the steam condenses. The condensed steam is then separated. The cooling to effect condensation of the steam may be effected by contacting the secondary reformed gas with a stream of cold water: as a result a stream of heated water is formed which may be used to supply some or all of the steam required for reforming.

Typically the secondary reformed gas contains 5 to 15% by volume of carbon dioxide (on a dry basis). In one embodiment of the invention, after separation of the condensed water, carbon dioxide is separated from the synthesis gas prior to the Fischer-Tropsch synthesis stage and recycled to the synthesis gas production. Such recycle of carbon dioxide is preferred as it provides a means to control $[H_2]/[CO]$ ratio to achieve the optimal figure for FT synthesis of about 2. Preferably the amount of recycled carbon dioxide is maximised up to the quantity which is needed to achieve this ratio. Typically this may be at least 75%, particularly at least 90%, of the carbon dioxide in the de-watered secondary reformed gas. The recycled carbon dioxide stream may be added, as in the aforesaid WO 00/09441, to the feedstock prior to feeding the latter to the heat exchange reformer or preferably to the secondary reformer feed stream before the latter is fed to the secondary reforming step. The carbon dioxide may be added before, after or together with the hydrocarbon feedstock and tail gas. Preferably the recycled carbon dioxide is added separately to the secondary reformer feed stream because it may be heated to temperatures greater than 420° C. As stated above, where the recycled carbon dioxide (either as carbon dioxide separated from the synthesis gas prior to synthesis and recycled, or as the recycled tail gas) is added to the primary reformed gas, rather than to the feedstock prior to primary reforming, there is an advantage in that the primary reforming process can be operated at a lower steam ratio.

The carbon dioxide may be separated by a conventional "wet" process or alternatively a pressure swing adsorption process may be employed. In a conventional "wet" process the secondary reformed gas is de-watered and is then contacted with a stream of a suitable absorbent liquid, such as an amine, particularly methyl diethanolamine (MDEA) solution so that the carbon dioxide is absorbed by the liquid to give a laden absorbent liquid and a gas stream having a decreased content of carbon dioxide. The laden absorbent liquid is then regenerated, for example by heating, to desorb the carbon dioxide and to give a regenerated absorbent liquid, which is then recycled to the carbon disoxide absorption stage. At least part of the desorbed carbon dioxide is recycled to the primary reforming step as described above. If the carbon dioxide separation step is operated as a single pressure process, i.e. essentially the same pressure is employed in the absorption and regeneration steps, only a little recompression of the recycled carbon dioxide will be required. Unless it is desired that the product synthesis gas has a very low carbon dioxide content, it is generally not necessary to effect the regeneration of the absorbent liquid to a very low carbon dioxide content.

Alternatively, or in addition to a stage of carbon dioxide separation and recycle, before the de-watered synthesis gas is passed to the Fischer-Tropsch hydrocarbon synthesis stage it may be further subjected to a step of hydrogen separation, e.g. through a membrane in order to provide pure hydrogen for other uses e.g. hydrocracking or hydrodesulphurisation. In this situation, the tail gas recycle (in the absence of carbon dioxide separation and recycle) or the carbon dioxide recycle stream are controlled to give a $[H_2]/[CO]$ ratio, which is higher than the optimum for Fischer-Tropsch synthesis, so that after the required amount of hydrogen is separated the resulting synthesis gas has an $[H_2]/[CO]$ ratio of about 2.

In the Fischer-Tropsch process, a synthesis gas containing carbon monoxide and hydrogen is reacted in the presence of a catalyst, which is typically a cobalt- and/or iron-containing composition. The process may be effected using one or more fixed catalyst beds or one or more reactors using a moving catalyst, for example a slurry of the catalyst in a hydrocarbon liquid. The product hydrocarbon liquid is separated from the residual gas. The reaction may be carried out in a single pass or part of the residual gas may be combined with fresh synthesis gas and recycled to the Fischer-Tropsch reactor. Any residual gas which is not recycled to the Fischer-Tropsch reactor for further reaction is herein termed tail gas. Since the reaction of the synthesis gas is incomplete, the tail gas will contain some hydrogen and carbon monoxide. In addition, the tail gas may also contain some light hydrocarbons, e.g. paraffins including methane, ethane, butane, olefins such as propylene, alcohols such as ethanol, and traces of other minor components such as organic acids. It will generally also contain some carbon dioxide, which may be present in the synthesis gas fed to the Fischer-Tropsch reaction and/or is formed by side reactions. Possibly, as a result of incomplete separation of the liquid hydrocarbon product, the tail gas may also contain a small proportion of higher hydrocarbons, i.e. hydrocarbons containing 5 or more carbon atoms. These components of the tail gas represent a valuable source of carbon and hydrogen.

In the present invention at least part of the tail gas is recycled and used as part of the feedstock employed to make the Fischer-Tropsch synthesis gas. The amount of tail gas recycled is preferably between 5 and 100% by volume of the tail gas produced in the Fischer-Tropsch synthesis stage.

In the present invention the hydrocarbon feedstock is divided into two streams. The second hydrocarbon stream bypasses the primary reforming step and is added to the secondary reformer feed stream prior to combustion thereof in the secondary reformer. The second hydrocarbon stream comprises between 5 and 50% by volume, preferably between 5 and 40% by volume and most preferably between 5 and 30% by volume of the hydrocarbon feedstock. Amounts less than 5% by volume provide too small a benefit whereas amounts greater than 30%, especially 50% are less economically attractive due to a consequential increase in size and cost of the primary reformer (because of the resulting drop in the secondary reformed gas temperature and thereby heat exchange with the primary reformer), or increased requirement for oxygen in the secondary reforming step.

By providing a proportion of the hydrocarbon feedstock and at least part of the Fischer-Tropsch tail gas to the primary reformed gas, it is possible to operate the process at low overall steam ratios without the risk of carbon deposition. Overall steam ratios in the range 0.8 to 1.2 may be achieved using the process of the present invention without the risk of significant carbon deposition in the primary reforming stage.

Referring now to the drawing. in FIG. 1, hydrocarbon feedstock, for example natural gas containing over 90% v/v methane, fed via line 10 is divided into two streams. The first stream is fed via line 12 to a saturator 14 where it is contacted with hot water provided by line 16. Waste hot water is recovered via line 18 and may be recycled if desired. The resulting mixture of first hydrocarbon stream and steam is fed, typically at a pressure in the range 10 to 60 bar abs., via line 20 to a heat exchanger 22 and thence, via line 24, to the catalyst-containing tubes 26 of a heat exchange reformer 28. The mixture is typically heated to a temperature in the range 300 to 500°C. prior to entry into the tubes 26. For simplicity only one tube is shown in the drawing: in practice there may be several tens or hundreds of such tubes.

The feedstock/steam mixture undergoes primary steam reforming in the tubes 26 and the primary reformed gas leaves the heat exchange reformer 28 via line 30, typically at a temperature in the range 650 to 850° C.

The primary reformed gas in line 30 is mixed with Fischer-Tropsch tail gas (to be described) fed via line 32.

The resulting primary reformed gas/tail gas mixture then proceeds via line 34 and is mixed with the second hydrocarbon stream, fed via line 36 and which has been pre-heated in heat exchanger 38. The resulting secondary reformer feed stream comprising the primary reformed gas/tail gas/hydrocarbon mixture is fed via line 40 to a secondary reformer 42, to which oxygen is supplied via line 44.

The secondary reformer feed stream is partially combusted in the secondary reformer and brought towards equilibrium by passage over a secondary reforming catalyst. The secondary reformed gas leaves secondary reformer via line 46, typically at a temperature in the range 900 to 1050° C.

Heat is recovered from the hot secondary reformed gas by passing the secondary reformed gas via line 46 to the shell side of the heat exchange reformer 28 so that the secondary reformed gas forms the heating medium of the heat exchange reformer. The secondary reformed gas is thus cooled by heat exchange with the gas undergoing reforming in the tubes 26 and leaves the heat exchange reformer via line 48, typically at a temperature 50 to 200° C. above the temperature at which the first hydrocarbon stream/steam mixture is fed to the tubes 26.

The partially cooled secondary reformed gas is then cooled further with heat recovery in one or more heat exchangers 50 to a temperature below the dew point of the water in the secondary reformed gas. The cooled secondary reformed gas is then fed via line 52 to a separator 54 wherein condensed water is separated as a liquid water stream 56. This water may be recycled by heating it in a heat exchanger (not shown) and feeding it to line 16 for use in the saturator 14.

The resulting de-watered synthesis gas is then fed from the separator 54, via line 58, to an optional hydrogen separation unit 60, e.g. a membrane unit or a pressure swing adsorption stage, to separate part of the hydrogen in the de-watered synthesis gas as a hydrogen stream 62. The resultant synthesis gas is then fed via line 64 to a Fischer-Tropsch synthesis stage 66, wherein liquid hydrocarbons are synthesised and are separated, together with by-product water, as a product stream 68 leaving a tail gas stream 70. Part of the tail gas is purged as stream 72 to avoid a build up of inerts, e.g. nitrogen which may be present in the hydrocarbon feedstock or oxygen-containing gas fed to the secondary reformer. The purged tail gas may be used as fuel, for example in a fired heater used for heating the mixture of first hydrocarbon stream and steam fed to the heat exchange reformer. The remainder of the tail gas is fed to a compressor 74 and then to a heat exchanger 76 and then fed via line 32 to be mixed with the primary reformed gas 30.

Figure 2:
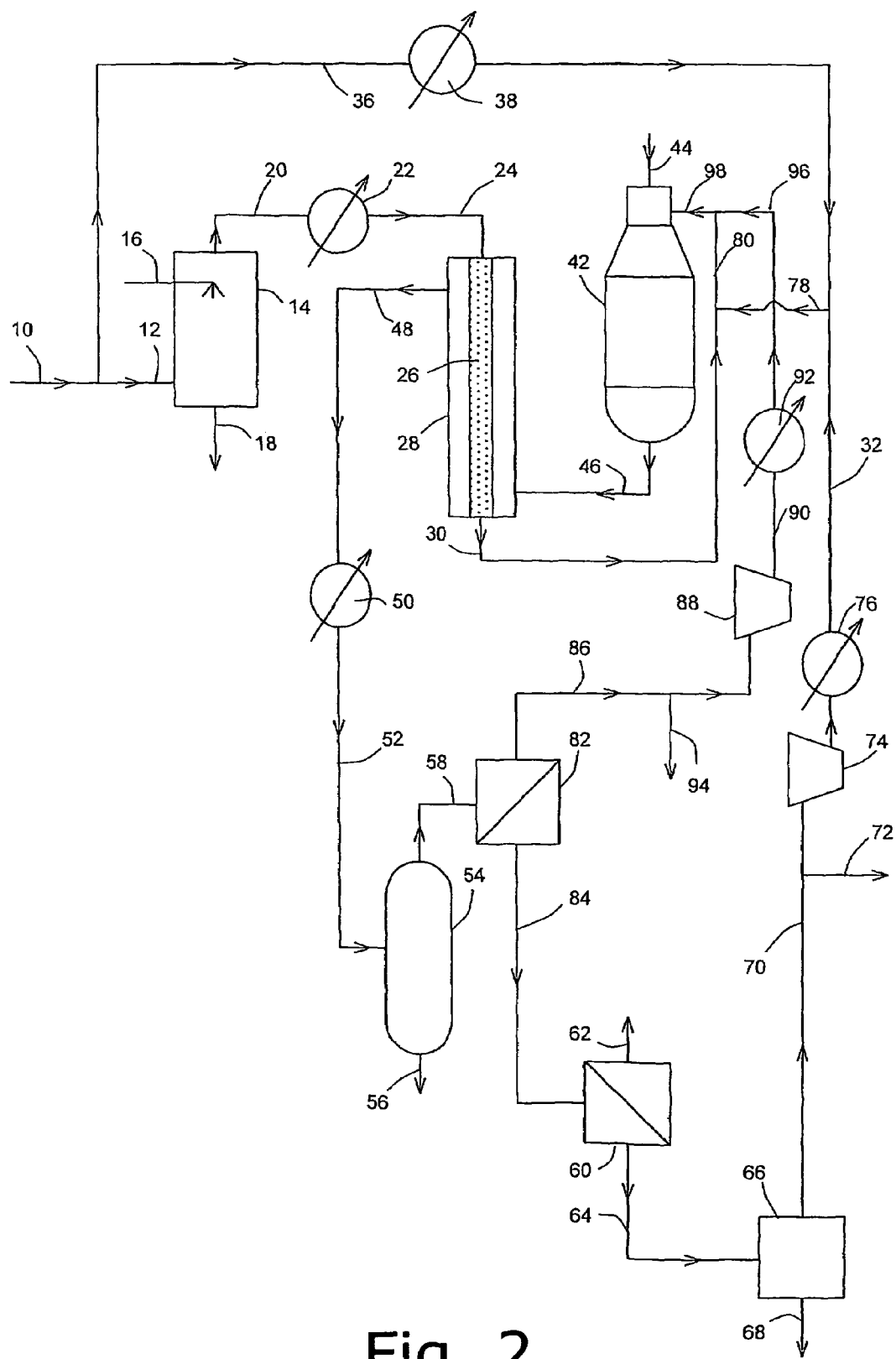
FIG. 2 is a schematic of a second embodiment of the invention where, in addition to Fischer-Tropsch tail gas and hydrocarbon, carbon dioxide separated from secondary reformed gas is added to the primary reformed gas to form the secondary reformer feed stream.

In FIG. 2, the second hydrocarbon stream by-passing the primary reforming stage via line 36 and heat exchanger 38 is mixed with the Fischer-Tropsch tail gas fed vial line 32 and the resulting mixture fed via line 78 to the primary reformed gas 30 to form a primary reformed gas mixture 80.

The de-watered synthesis gas is fed via line 58 to a carbon dioxide separation stage 82 wherein carbon dioxide is separated from the de-watered synthesis gas. The resulting de-watered, carbon dioxide-depleted synthesis gas is fed via line 84 to the optional hydrogen separation unit 60 and thence to the Fischer-Tropsch synthesis stage 66. The separated carbon dioxide from separation stage 82 is fed via line 86 to a compressor 88 and then via line 90 to a heat exchanger 92. To further improve control of the gas composition, separated carbon dioxide may be purged from the process prior to compression and heating via line 94. The heated, compressed carbon dioxide stream is fed from heat exchanger 92 via line 96 to the primary reformed gas mixture 80 and the resulting secondary reformer feed stream passed to the secondary reformer 42 via line 98.

Figure 3:
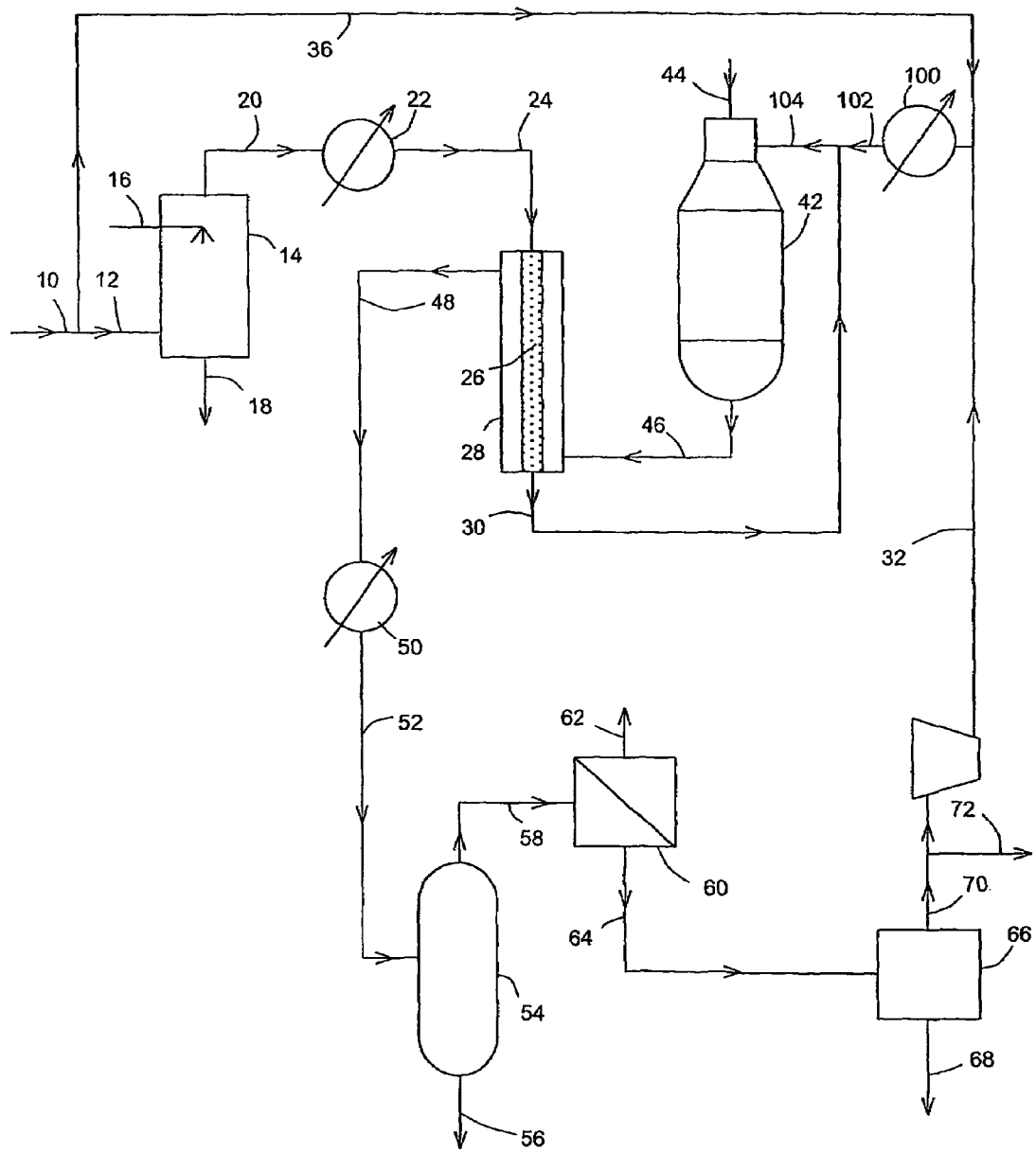
FIG. 3 is a schematic of a third embodiment of the invention whereby Fischer-Tropsch tail gas and hydrocarbon feedstock are combined, heated and added to the primary reformed gas to form the secondary reformer feed stream.

In FIG. 3, the carbon dioxide recovery and recycle stage of FIG. 2 is omitted and heat exchangers 38 and 76 are omitted. The second hydrocarbon stream by-passing the primary reforming stage via line 36 is mixed with the Fischer-Tropsch tail gas fed via line 32 and the resulting mixture heated in heat exchanger 100 before feeding via line 102 to the primary reformed gas 30 to form the secondary reformer feed gas mixture, fed to the secondary reformer via line 104.

The invention is further illustrated by the following calculated examples.

EXAMPLE 1

FIG. 4 is a table that contains data calculated for a Fischer-Tropsch process operated in accordance with the schematic depicted in FIG. 2. The data demonstrates that the process of the present invention is able to provide a steam ratio in the heat-exchange reactor tubes of 1.25 and thereby, with a nickel steam reforming catalyst avoid carbon deposition, yet based on total hydrocarbon feed to the process, the overall steam ratio is 1.0.

EXAMPLE 2

FIG. 5 is a table contains data calculated for a 80,000 barrel-per-day Fischer-Tropsch process operated in accordance with the schematic depicted in FIG. 3. The data demonstrated that the process of the present invention is able to provide a steam ratio in the heat-exchange reactor tubes of 0.88 and thereby, with a precious metal reforming catalyst avoid carbon deposition, yet based on total hydrocarbon fed to the process, the overall steam ratio is 0.66.

In the following table the pressure(P, in bar abs.), temperatures (T, in °C.) and flow rates (kmol/h) of the various components of the streams are quoted, rounded to the nearest integer. 1 bara=10000 Pa or 100 kPa.

The invention claimed is:

1. A process for the production of hydrocarbons comprising:
   a) subjecting a hydrocarbon feedstock to steam reforming by
      i) dividing the feedstock into first and second streams,
      ii) mixing the first stream with steam, passing the mixture of the first stream and steam over a catalyst disposed in heated tubes in a heat exchange reformer to form a primary reformed gas,
      iii) forming a secondary reformer feed stream comprising the primary reformed gas and the second hydrocarbon stream,
      iv) partially combusting the secondary reformer feed stream with an oxygen-containing gas and bringing a resultant partially combusted gas towards equilibrium over a secondary reforming catalyst to form a resultant secondary reformed gas, and
      v) using the resultant secondary reformed gas to heat the tubes of the heat exchange reformer, thereby producing a partially cooled reformed gas,
   b) further cooling the partially cooled reformed gas to below the dew point of the steam therein to condense water and separating condensed water to give a de-watered synthesis gas, c) synthesising hydrocarbons from said de-watered synthesis gas by the Fischer-Tropsch reaction and separating at least some of the synthesised hydrocarbons, to give a tail gas, and d) incorporating at least part of said tail gas into the secondary reformer feed stream before the partial combustion of thereof.

2. A process according to claim 1 wherein the second hydrocarbon stream comprises between 5 and 50% by volume of the hydrocarbon feedstock.

3. A process according to claim 1 wherein carbon dioxide is separated from the synthesis gas prior to synthesis of the hydrocarbons and is added to the secondary reformer feed stream before the partial combustion thereof.

4. A process according to claim 3 wherein the tail gas and second hydrocarbon stream are combined and added to the primary reformed gas separately from the separated carbon dioxide.

5. A process according to claim 1 wherein the de-watered synthesis gas is subjected to a step of hydrogen separation before it is passed to the Fischer-Tropsch hydrocarbon synthesis stage.

6. A process according to claim 1 wherein the catalyst disposed in heated tubes in the heat exchange reformer comprises a nickel catalyst and/or a precious metal catalyst.

* * * * *